June 25, 1968  W. T. ILLINGWORTH  3,390,248
ELECTRIC RESISTANCE WELDER
Filed July 10, 1964  5 Sheets-Sheet 1

William T. Illingworth,
Inventor.
Koenig, Senniger,
Powers and Leavitt,
Attorneys.

June 25, 1968   W. T. ILLINGWORTH   3,390,248
ELECTRIC RESISTANCE WELDER
Filed July 10, 1964   5 Sheets-Sheet 5

FIG. 9.

United States Patent Office 3,390,248
Patented June 25, 1968

3,390,248
ELECTRIC RESISTANCE WELDER
William Thomas Illingworth, Houston, Tex., assignor to Texas Instruments Incorporated, Dallas, Tex., a corporation of Delaware
Filed July 10, 1964, Ser. No. 381,778
16 Claims. (Cl. 219—86)

ABSTRACT OF THE DISCLOSURE

A resistance welding machine with an electric motor driven mechanism for driving the electrodes into engagement with the workpiece. Upon the attainment of a preselected electrode pressure, a switch is activated to stop the drive motor and initiate the welding cycle. Two opposing moments, one caused by adjustable spring biasing means and the other the resultant of the reaction force caused by the drive motor driving the electrodes into engagement, cause a control lever to pivot and thereby activate the control switch.

This invention relates to electric resistance welders, and with regard to certain more specific features, to programmable automatic welders of this class.

Among the several objects of the invention may be noted the provision of an automatic electrical resistance welder for the high-speed production of reliable welds of parts such as, for example but without limitation, electronic components, matrix circuitry, circuit boards and the like which may involve thin film, micro bonding and like critical techniques; the provision of a welder of the class described by means of which high standards of critical weld qualities may be accurately reproduced by comparatively unskilled operators in continuous or interrupted production runs; the provision of a welder of the class described which may be programmed by punch cards, punched tape or the like and which may itself be employed to ascertain parameters for constructing such cards, tape or the like for future use; and the provision of a welder of the class described which is flexible in application to all classes of electric resistance welding, including parallel-gap welding, parallel-series welding, opposed welding including spot welding, pincer welding, stitch welding and variations thereof. Other objects and features will be in part apparent and in part pointed out hereinafter.

The invention accordingly comprises the elements and combinations of elements, features of construction, and arrangements of parts and circuits which will be exemplified in the constructions hereinafter described, and the scope of which will be indicated in the following claims.

In the accompanying drawings, in which several of various possible embodiments of the invention are illustrated.

Corresponding reference characters indicate corresponding parts throughout the several views of the drawings.

Figure 1:
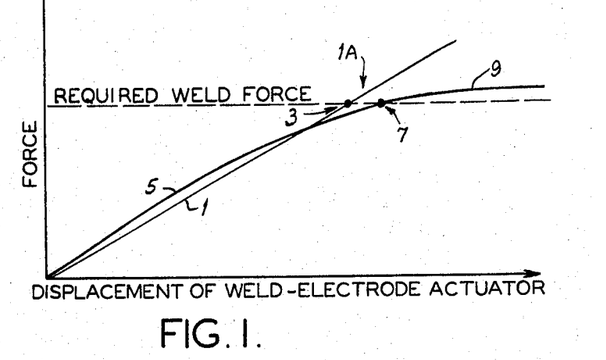
FIGURE 1 is a chart illustrating certain difficulties which, among others, the invention overcomes.

For any given electrical resistance welding operation, data are required concerning several variables which control the quality of the weld. These variables are some combination of the values of several or all of the following: squeezing force at the weld by the electrode or electrodes, hereinafter called weld force (which for a given electrode contact area determines the pressure at the weld); capacitor voltage; pulse voltage; and welding energy. Heretofore, after a combination of these was determined upon, trial welds were performed with the control adjustments of the welding apparatus set to obtain the desired values. After having made a statistical number for trials, the welds were subjected to strength and other tests and to determine weld quality. In many cases the data from these tests were plotted on a suitable chart which was then read and interpreted by a welding engineer. He then deduced the optimized weld program for these particular elements, to be manually set into the production welding equipment prior to making a production run. This in many cases also required each piece of welding equipment to be subjected to further adjustments, even when the same make and model of welders was used on a production line. This was because each machine deviates structurally somewhat from one another. Thus prior to my invention, the proper operation of each welder in a production line entailed and depended upon the knowledge and experience of both the welding engineer and the equipment operator to ensure that all controls were properly adjusted on all equipment to produce welds of constant quality. Thus, formerly it was difficult after all variables had been selected as to value to reproduce a group of settings which would duplicate those originally set into the welders to obtain constant values according to the selection. A particular difficulty arose in connection with the coordination of displacement and force applied by the operator to the electrode at the time of electrical firing to produce a weld. This is illustrated in FIGURE 1 wherein the ordinates represent the weld force under which an electrode is applied to the members to be welded and the abscissae represent the displacement of the electrode, usually under hand or foot control. The horizontal broken line represents the required weld force which should be used upon firing and should not be exceeded if constantly good welds are to be obtained.

Line 1 illustrates how, with former weld electrode actuators, force on the electrode increases with displacement of the actuator. Firing occurs at point 3 where line 1 crosses the broken line. However, since the operator was not provided with any limitation upon the force applied when firing occurred at 3, additional undesirable force increase occurred. The strongly rising characteristic of line 1 and 1A above the broken line illustrates this difficulty.

Line 5 on FIGURE 1 illustrates improved operation when carried out according to the present invention. This line crosses the broken line at 7 whence firing occurs, but unlike line 1, line 5 rises above the broken line only slightly or imperceptibly, as indicated at 9. Thereafter line part 9 of the line remains more or less level, indicating that it is not possible to apply any substantial additional force after firing. It should be noted that FIGURE 1 is illustrative only of the features under discussion.

According to the invention, certain desired values of welding variables, including force applied to the electrode or electrodes, are obtained from a program card or tape and automatically brought into operation for a particular electrode contact area and weldment desired. The card or tape programs the welder to operate according to the values of the variables selected rather than as heretofore according to a program gotten by various manual adjustment provided on the welder for manual use of the operator. The improved apparatus permits of the use of a library of program cards or tape made up from experimentally deduced data for future programming use.

In view of the above it will be apparent that former welders employing resistance welding techniques have suffered from the characteristic but the settings of the welding function variables needed to be made by adjustment such as control knobs or the like which require skilled and/or professional attention in order properly to schedule the welding operation. In addition, on many of the existing welders, in order to change from one to another type of welding (from opposed to parallel-gap, for example), major weld-head adjustments were required and in some instances a complete weld-head change-over. According to the present invention, minimum electrode weld-head adjustments are required, preferably utilizing but a single weld head.

Referring now to FIGURES 2–8 of the drawings, numeral 11 indicates a lower rigid arm or platen extending from a suitable console housing 13 in which the required electrical circuitry is contained. At numeral 15 is shown an upper rigid bracket assembly, also extending from the housing 13. Assembly 15 comprises an upper extension or top 17 and a lower extension or bottom 19 connected at their outer ends by means of a guide post 21. Thus a long throat 2 is provided between arm members 13 and 15.

Slidable on the post 21 is a sleeve 23 to which is attached a weld-head assembly 25. The sleeve 23 and the weld-head assembly 25 may move up and down relative to the fixed platen 11. The sleeve 23 is formed with an inside arm 27 having a tongue 29 extending into a groove 31. The groove 31 is formed in a platform 33 connected to and extending up from the bottom extension 19. The platform 33 has a fixed extension 35 extending over the movable arm 27. Extension 35 forms a support for several vertical guide posts 37 which are fixed on extension 35. The outside frame or casing of an actuator motor 39 is vertically slidable on the guide posts 37. Normally this frame rests on lower collars 4 of the posts 37. The actuator motor 39 has a drive shaft 41 which carries a drive screw 43 threaded through a threaded opening in the arm 27. The screw 43 is not threaded into the extension 35 but extends with ample clearance through an opening 45 therethrough.

Figure 2:
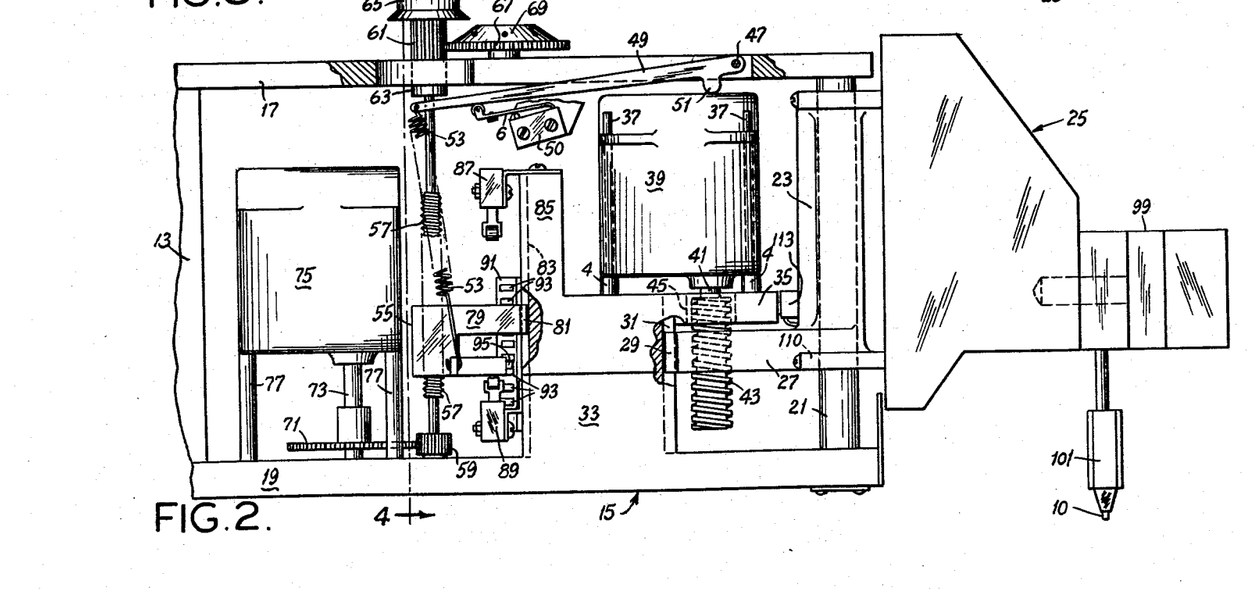
FIGURE 2 is a left side elevation of operating parts of the invention, parts being broken away for clearer illustration.
Figure 3:
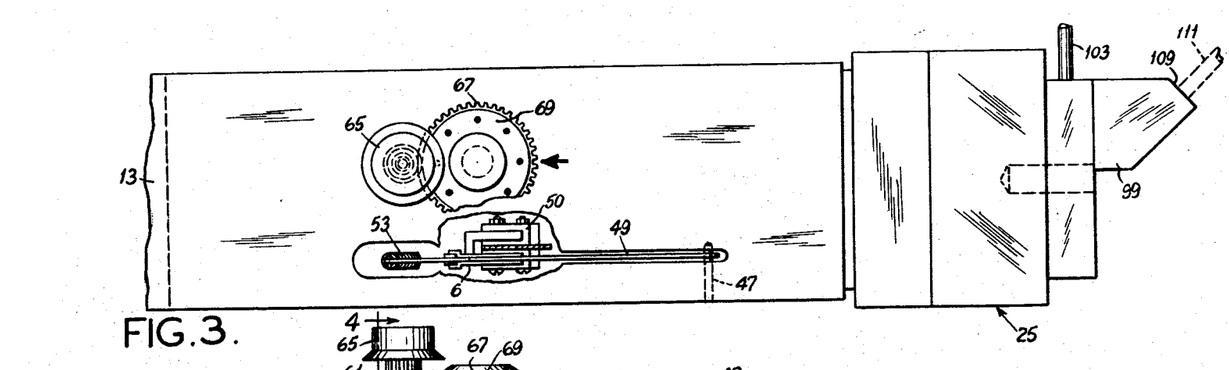
FIGURE 3 is a partial plan view of FIGURE 2, parts being broken away.
Figure 4:
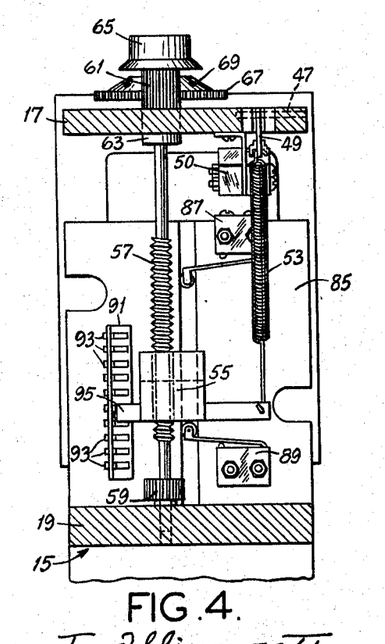
FIGURE 4 is a cross section taken on line 4—4 of FIGURE 2.
Figure 5:
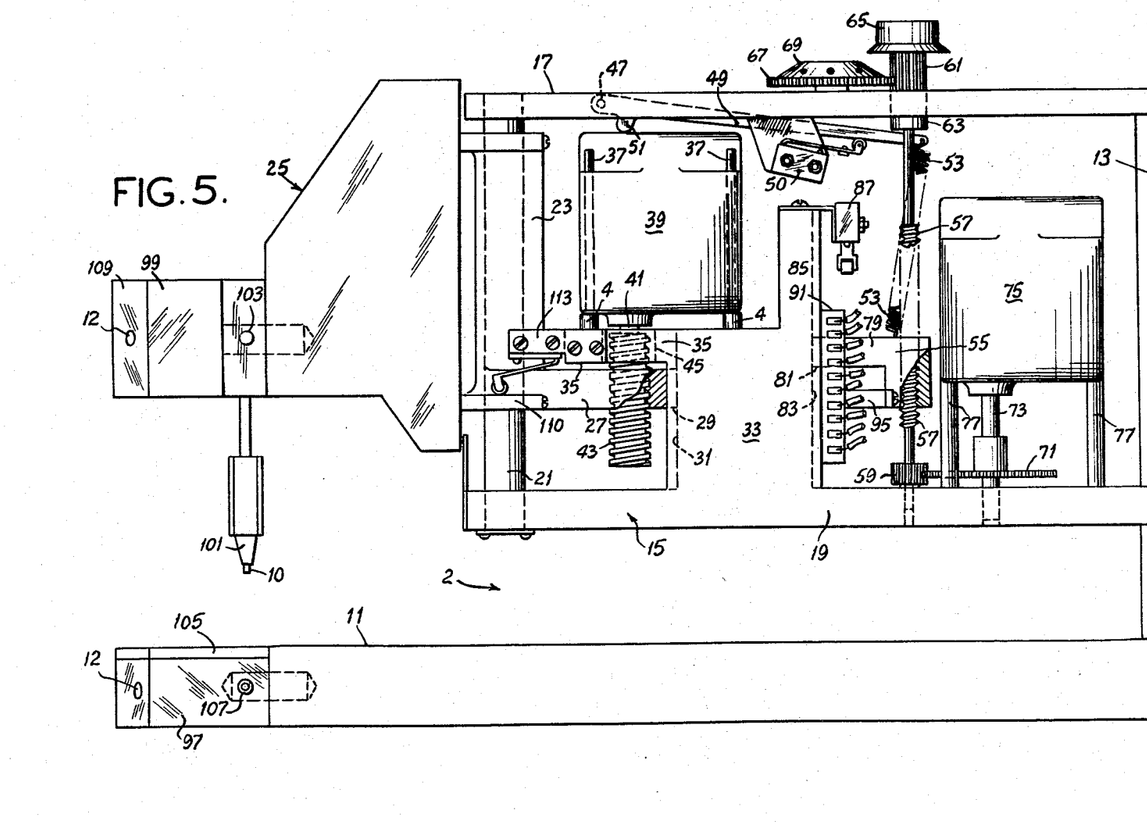
FIGURE 5 is a view similar to FIGURE 2 but showing a right side elevation of parts.

Pivoted at 47 to the top 17 is a reaction member in the form of a lever 49. This has a lug 51 engaging with the upper end of the casing of motor 39, so that the lever may swing in response to any upward movements of the motor casing on the guide posts 37. Contact is maintained between the lug 51 and the upper end of the motor casing by a tension spring or resilient member 53. This spring is fastened at one end to the outer end of the lever 49 and at the other end to a vertically movable scanner carrier 55. A bracket depending from the top 17 supports a roller-operated double-pole, single-throw switch 50 having an operative engagement with the lever 49. The switch 50 has two poles or sections 50A and 50B (see the wiring diagram, FIGURE 9).

Threaded through a threaded opening in the scanner carrier 55 is a lead screw 57. The lower end of screw 57 carries a pinion 59 and the upper end 19 carries a pinion 61 located above a suitable bearing 63 in the top 17. Attached above the pinion 61 is a manual control knob 65. The pinion 61 meshes with a gear 67 of an indicating dial 69 which may be appropriately calibrated, illustrated by dots. The lower pinion 59 meshes with a gear 71 which is carried on the shaft 73 of a force-selection motor 75. Motor 75 is wired for electrodynamic braking of its rotor. The casing of selection motor 75 is affixed to the bottom 19 by standards 77. The scanner carrier 55 includes an arm 79 on which is a tongue 81 movable in a vertical groove 83 in a wall 85 of the platform 33. At the top of the wall 85 is mounted a roller-operated motor reversing switch 87. At its bottom is mounted another roller-operated motor reversing switch 89. Mounted adjacent the carrier 55 is a fixed insulating block assembly 91 which carries fixed electrical scanner contacts 93. These are insulated from one another (see FIGURES 2, 4 and 9). Ten (for example) of these contacts 93 are shown, but it will be understood that other numbers may be employed, depending upon the fineness of control desired. Supported on the carrier 55 is a movable electrical scanner contact 95 which, when the scanner carrier 55 moves vertically, traverses the contacts 93.

At the outer end of the platen 11 is mounted a lower rotary turret 97 and on the front of the weld-head assembly 25 is mounted an upper rotary turret 99. Extending from one side of the upper turret 99 is a pair of parallel-gap weld electrodes 101, the extreme tips 10 of which have parallel side portions, so that under wear, the contact cross sections do not vary. Thus a given force on an electrode assembly is translated into a constant pressure (forced per unit of area) at the constant area between the electrode assembly and the work. Extending at a right angle from another side of the turret 99 is an electrode 103 for so-called spot or vertically opposed welding.

Figure 6:
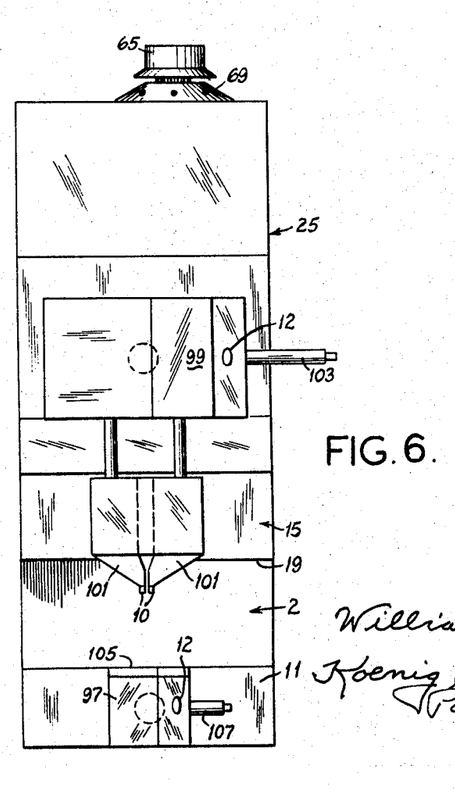
FIGURE 6 is a left end view of FIGURE 2, showing certain welding turrets in one position.
Figure 7:
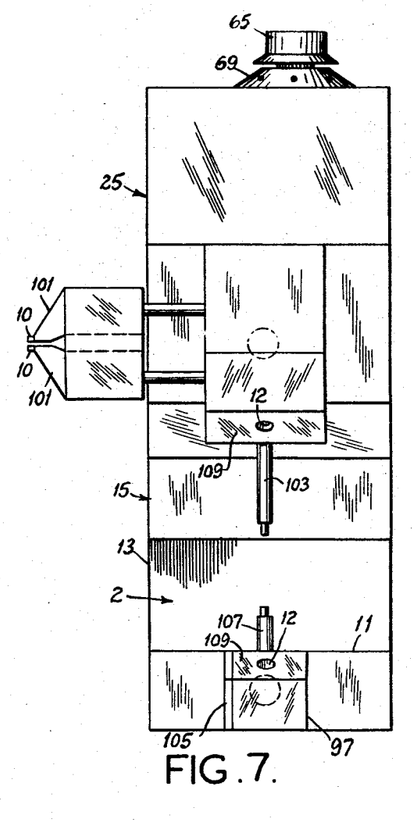
FIGURE 7 is a view similar to FIGURE 6 but showing alternate positions of certain parts.
Figure 8:
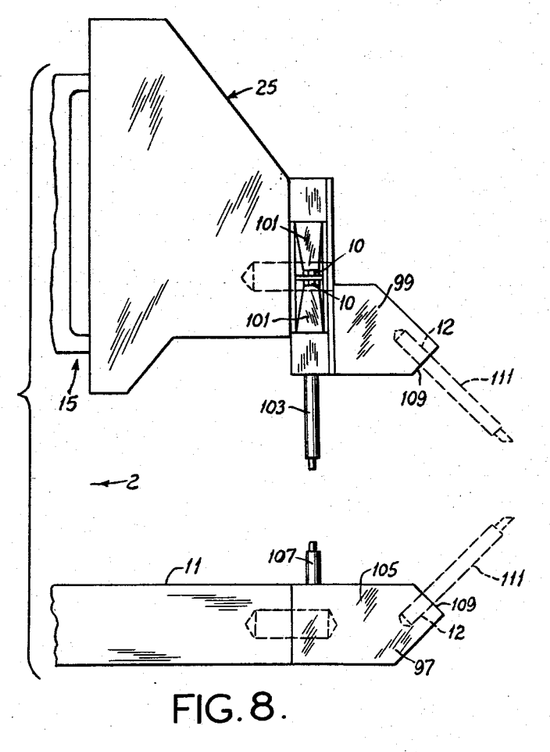
FIGURE 8 is a fragmentary side elevation of the turret parts as shown in FIGURE 7.

The lower turret 97 has upper flat insulating facing 105 and a ninety-degree transversely extending electrode 107 for spot or vertically opposed welding. When the turrets are turned as shown in FIGURES 2 and 6, the set-up is for a parallel-gap welding. When the turrets are turned as shown in FIGURES 7 and 8, the set-up is for spot or vertically opposed welding. The turrets 97 and 99 are also provided with angular faces 109 in which are openings 12 for the reception of pincer electrodes 111 arranged for pincer welding in a vertical plane. The pincer electrodes 111 are shown by broken lines in FIGURE 8 only.

The above examples of the various modes in which the electrodes may be mounted do not exhaust all of the possibilities in this regard. For example, arrangements may be made on the turrets 97 and 99 for positioning electrodes in the so-called pincer off-set mode, or for stitch welding and the like. It will be understood that appropriate connections from the electrodes are made to the power source according to the electrode arangements selected. Associated with the housing 13 is a conventional programming card reader or the like illustrated electrically on FIGURE 9 in two sections 117A and 117B. The mechanical construction of the reader 117A, 117B is conventional and may be mounted in a convenient position on the console 13. The programming device to be read may be one of various kinds for the purpose, the one illustrated accommodating a punch card. It dictates the mechanical force to be applied to the work at the weld by the electrodes and the watt seconds of electrical energy to be employed for weld firing under such force.

Details of electrical circuits (FIGURE 9) will be given below after mechanical functions have been described which are as follows:

When a previously prepared programming card is inserted into the reader, appropriate circuits are prepared among which is one through a certain one of the fixed contacts 93. As will appear, a start switch 132 is closed by insertion of a programming card to start the selection motor 75. Motor 75 then, while rotating, drives the lead screw 57 through the gear train 71, 59. Screw 57 drives the scanner carrier 55, causing the scanner contact 95 initially to advance over the contacts 93 in unprepared circuits until a contact in the prepared circuit (as determined by the card) is reached. Then when the scanner contact 95 reaches this certain contact 93, the force selection motor 75 will be deexcited and electrodynamically braked.

If the movable scanner contact assembly 55, 95 was previously programmed for a position above the now-selected position, and if the drive motor turning the screw 57 is such that the movable scanner contact 95 is traveling down, then it will continue down until the carrier 55 contacts switch 89. Switch 89 then reverses the motor direction and causes the screw 57 to turn in the opposite direction, and contact 95 will then travel up until the discrete contact 93 in the prepared circuit is found by the moving contact 95. If the movable scanner contact assembly 55, 95 was previously programmed for a position below the non-selected position and if the drive motor was turning the screw 57 such that the movable scanner contact 95 is traveling up, then it will continue up until the carrier 55 contacts switch 87, which reverses the motor direction and causes the screw 57 to turn in the opposite direction to cause carrier 55 to travel down until the fixed contact 93 in the prepared circuit is found by the moving contact 95. Since the movement of scanner carrier 55 adjusts the stress or preload in the reaction spring 53, appropriate force will be applied to the outer end of the lever 49. Thus an appropriate resilient preloading will be applied to oppose the reaction force between the lug 51 and the casing of the actuator motor 39.

At the time that contact is made between the scanner contact 95 and the contact 93 of the prepared circuit, the circuit will cause deexcitation of the motor 75 and at the same time effect appropriate connections for electrodynamic braking of the same, so that the mechanical system comes to rest with the stated preload on the housing of the actuator motor 39. Since the shaft of screw 57 will also turn gear train 61, 67, the indicating dial 69 by suitable calibration will show that pressure is being applied, as dictated by the programming card which was used. Knob 65 will also have been turned, but this is incidental at this time.

The purpose of the knob has nothing to do with operation of the machine in production welding. It was used to operate the screw 57 for obtaining various pressures at 51 during experimentation to obtain information for preparing program cards for use in future production. This illustrates a desirable feature of the invention, namely, that once a card has been prepared from experimental data and inserted into programming position, the welder will automatically go through the scanning operation to place the device in a condition wherein a predetermined force is applied by the spring 53 to the lever 49. In addition, information for card preparation can be obtained by manual settings of knob 65 and readings taken on dial 69. Thereafter cards so prepared when inserted produce the same force parameters as were used in card preparation.

Figure 9:
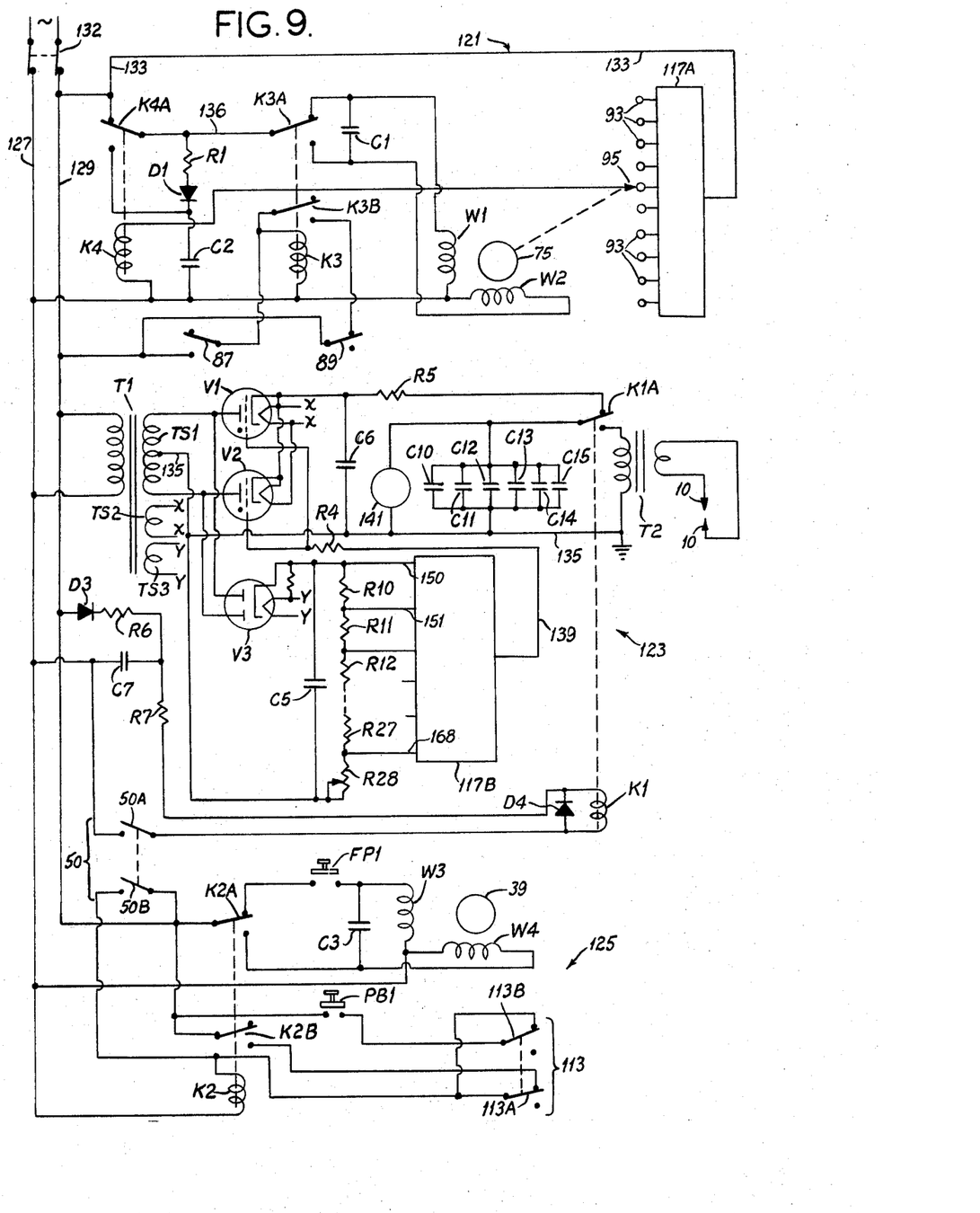
FIGURE 9 is a wiring diagram.

The actuator motor 39 is in a power circuit in which is a foot or hand switch FP1 responsive to the commands of the operator (see FIGURE 9). When the switch FP1 is closed, the actuator motor 39 drives the screw 43 in a direction to drive down the head 25, thus bringing the electrode or electrodes carried thereby down into contact with the work to be welded. Upon contact, a rising reaction force sets in with a resulting tendency for the screw 43 to back out of the nut-forming portion of the arm 27 as pressure increases. When this occurs, the frame of the actuator motor 39 is driven to slide up on the posts 37. In doing so, it pushes up on the lug 51, thus pushing up on the lever 49. When the reaction force overbalances the preloading determined by the amount of stress which scanner carrier 55 has put into spring 53, the lever 49 will move up and operate switch 50. Thus at the time that the switch 50 is operated, a predetermined pressure has been obtained between the electrodes and the work being welded.

The switch 50 is constructed both to close a circuit for reversing actuator motor 39, and for closing a circuit for firing a predetermined number of watt seconds of energy through the pressurized electrodes and the work to form the desired weld nugget. Reversal of the actuator motor 39 causes its frame to descend to contact collars 4 at the lower end of its travel. The screw 53 continuing to turn then draws up the assembly 27, 23, 25, thus retracting from the welded work the electrode or electrodes mounted on the upper turret 99.

When the upper end of the travel is reached, a bracket 110 on the arm 27 engages a homing switch 113 mounted on extension 35. This has two poles 113A and 113B which show on the electrical circuit of FIGURE 9. Such engagement deactivates the actuator motor 39.

The welder control circuitry is illustrated diagrammatically in FIGURE 9 and may be conveniently described in three parts, the weld-force programmer circuit 121, the welding energy power supply 123 and the weld-head actuator circuit 125.

The weld-force programmer circuit 121 controls the motor 75 which adjusts the tension spring 53 to give the desired mechanical welding force. The motor 75 is a split-phase induction motor having a pair of phase displaced windings W1 and W2. One end of each of these windings is connected to one (127) of a pair of A.C. power supply lines 127 and 129. These power lines are connected, through a double-pole, single-throw switch 132, to a conventional power outlet (not shown) providing 115 v. 60 c.p.s. alternating current. The switch 132 is incorporated into the card reader 117A, 117B and is responsive to the presence of a punch card in proper position to provide power to the control circuitry so that the welder is energized only when a card is inserted into the reader.

During force selection, the line 136 is connected to the A.C. supply line 129 through the normally closed side of relay contacts K4A. Motor windings W1 and W2 can be alternately connected to the line 136 through opposite sides of a set of relay contacts K3A. A phase-shifting capacitor C1 is connected across the lines joining these relay contacts to the motor windings so that, when one motor winding is directly connected to the A.C. source through the relay contacts, the other winding will be connected to the source through the capacitor C1 in series thereby establishing the direction of rotation of the motor in conventional manner. Relay contacts K3A thus provide a means for reversing the motor 75, for the purpose above described.

The contacts K3A are controlled by a relay coil K3. Relay K3 is energized from the A.C. supply lines 127 and 129 by alternate circuits, one of which includes the normally open upper limit switch 87 and the other of which includes the normally closed lower limit switch 89 and serially connected relay contacts K3B.

An energy storage capacitor C2 is connected to the line 136 through a circuit including diode D1 so that, when the line 136 is energized, the capacitor C2 is charged so as to provide a reservoir of direct current. A series resistor R1 limits the charging current. Capacitor C2 is also connected to the normally open side of the relay contacts K4A through which the motor windings are energized.

Relay contacts K4A are controlled by a relay coil K4. This coil is connected across the A.C. supply lines 127 and 129 through a circuit which includes the line 133, the first section 117A of the card reader, the movable force scanning contact 95, and the stationary scannable contacts 93. The card reader is operative, as described previously, to prepare a circuit by connecting the line 133 to a discrete one of the stationary contacts 93.

When a program card is properly positioned in the reader 117A, 117B, the switch 132 is closed and welder control circuitry is thereby energized. Assuming that the circuit components are in the positions shown and that the movable force scanner contact 95 is not already in engagement with the prepared circuit through the chosen fixed contact 93, the motor 75 will be energized through relay contacts K4A and K3A and will rotate so as to raise the movable force scanner contact 95. If the movable contact 95 does not encounter the prepared circuit before reaching the top of its scan, the contact carrier 55 will engage the upper limit switch 87. The closing of the upper limit switch 87 will energize the relay coil K3 and the relay contacts K3A will reverse the direction of rotation of the motor. Simultaneously, the relay contacts K3B will close thereby establishing a holding circuit for the relay coil K3 through the normally closed lower limit switch 89. The movable scanner contact 95 will thus begin to move downwardly and will continue to do so under the control of the holding circuit.

When the movable contact 95 finally encounters that fixed contact 93 which is connected to the prepared circuit through the card reader section 117A, the relay coil K4 will be energized. The energization of relay coil K4 will cause the relay contacts K4A to disconnect the line 136 from the A.C. supply line 129 and connect it instead to the previously charged energy storage capacitor C2. The flow of direct current from capacitor C2 through the then-connected motor winding will provide electromagnetic braking which will bring the motor 75 to an abrupt stop while the movable contact 95 is still in engagement with the prepared circuit.

If for any reason the movable contact 95 should reach the lower end of its scan without encountering the prepared circuit, the contact carrier 55 will engage the normally closed lower limit switch 89. The opening of this switch will break the holding circuit for relay coil K3 so that the contacts K3A will again reverse the rotation of the motor 75 and the movable scanner contact 95 will start to rise. In other words, the scanner will hunt up and down until the prepared circuit is located and will then stop with the spring 53 being under the preselected tension or preload.

The second section 117B of the card reader is employed to program the amount of electrical energy to be provided for the weld by the power supply circuit 123. The weld impulse is obtained by the discharge of a bank of energy storage capacitors C10–C16 and the amount of energy discharged is thus conveniently controlled by varying the voltage to which the capacitor bank is charged. A meter 141 senses the voltage appearing across the capacitor bank and is preferably calibrated directly in corresponding watt seconds of energy so that the amount of energy, stored in the capacitors and available for welding, can be read directly.

Power for charging the capacitors is taken from the A.C. supply lines 127 and 129 through transformer T1. The transformer T1 has a center-tapped high voltage secondary TS1 and two filament windings TS2 and TS3. The center tap of the high voltage winding TS1 is connected to a common or ground bus 135 and the opposite ends of that winding are connected to the anodes of thyratrons V1 and V2. These thyratrons may, for example, be of the type 2D21. The filaments of the thyratrons V1 and V2 are connected for heating to the filament winding TS2 as indicated by the corresponding characters X—X. The lines establishing the actual connections to the various filaments have been omitted in the drawing so as not to confuse the illustration.

The cathodes of the two thyratrons are commonly connected through a charging current limiting resistor R5 and normally closed relay contacts K1A to the positive side of the capacitor bank C10–C16. Accordingly, if their firing is not inhibited by a negative voltage applied to their respective control grids, the thyratrons V1 and V2 will conduct on alternate half cycles so that the high voltage A.C. supplied by the winding TS1 is full-wave rectified and applied to charge the capacitor bank. A filter capacitor C6 connects the cathodes of the thyratrons to the ground bus 135 for shunting high frequency transients.

The high voltage A.C. provided by the winding TS1 is also full-wave rectified by rectifier tube V3 which may, for example, be a 6X4 type double diode rectifier having a common cathode. The filament of the rectifier V3 is tied to the cathode by resistor R3 so that its D.C. potential does not drift and is supplied with current from the filament winding TS3.

The pulsating D.C. provided by the rectifier tube V3 is filtered by the capacitor C5 and the filtered D.C. thereby obtained is applied across a voltage dividing network made up of serially connected resistors R10–R28. Taps 150–168 are connected to the junctions between the resistors in the voltage divider, so that a connection can be made to a voltage which is a selected portion of the substantially constant D.C. voltage applied across the entire divider. The last resistor R28 in the divider is a rheostat so that a vernier adjustment of the tap voltages can be made.

The taps 150–168 are connected to section 117B of the card reader. The card reader is operative, in response to a suitably punched program card, to connect line 139 to one of the taps 150–168. The voltage at the chosen tap is applied by the line 139, through current limiting resistor R4, to the control grids of thyratrons V1 and V2.

The power supply circuit 123 operates as follows:

Alternating current power from the high voltage secondary winding TS1 is rectified by the thyratrons V1 and V2 and the rectified energy is stored in the capacitor bank C10–C16. However, it is a characteristic of the gaseous discharge thyratron type of tube to conduct or fire only if the voltage at the control grid bears a certain relation to the voltage at the cathode. In the circuit illustrated, the preselected voltage applied to the control grids from the voltage divider R10–R28 by the card reader 117A, 117B effectively provides a limit beyond which the capacitor bank will not be charged. This limit is actually a few volts above the voltage at the selected one of the taps 150–168, since the control grids of the thyratrons must be slightly negative with respect to the voltage at the cathode in order to completely inhibit firing on each half cycle. This offset voltage is, however, easily determinable and will be inherently compensated for in making up programs for the welder by empirical methods. Thus the voltage to which the capacitors C10–C16 are charged is a simple function of the voltage at the selected tap.

The energy stored in the capacitor bank C10–C16 can be applied to the welding electrodes through a step-down welding transformer T2 by means of relay contacts K1A. The relay coil K1 is operated on direct current and for this purpose is provided with a separate D.C. supply involving rectifying diode D3, filter capacitor C7 and charging current limiting resistor R6. The circuit connecting the D.C. supply to the relay coil K1 includes a current limiting resistor R7 and the normally open section 50A of the weld-fire switch 50. Diode D4 connected across the relay coil K1 shunts inductively stored energy upon deenergization, thereby preventing burning of the contacts 50A.

As described previously, when the weld head 25 is lowered into engagement with the workpiece and the mechanical weld force builds up to the preselected level to overbalance the tension in the spring 53, the switch 50 is actuated. The contacts 50A then energize the relay coil K1, and the relay contacts K1A disconnect the capacitor storage bank from the thyratron charging circuit and connect it across the primary of the welding transformer T2 to initiate a current discharge from the capacitor bank through the welding electrodes.

The weld-head actuator circuit 125 controls the operation of the motor 39, the physical arrangement of which is described above. This motor also is a split-phase induction motor having two phase displaced windings W3 and W4. One end of each of the windings is connected directly to the A.C. power line 127. The opposite ends of the windings can be alternately connected to the other A.C. power line (129) through relay contacts K2A. The line to the winding W3 includes a normally open foot pedal switch FP1. A phase-shifting capacitor C3 connects the unjoined ends of the windings W3 and W4, so that when one of the windings is connected directly across the A.C. supply by contacts K2A, the other winding is connected to the A.C. supply through the capacitor C3 in series.

The contacts K2A are operated by relay coil K2. This relay coil can be energized from the A.C. lines 127 and 129 through contacts 50B of the weld firing switch 50. The physical arrangement of the weld firing switch 50 has been described previously, but, to summarize, it is actuated when the electrodes are brought into contact with the workpiece with the desired welding force so that reaction force on the motor 39 displaces the force control lever 49.

The relay coil K2 also operates contacts K2B which, with switch contacts 113A, form a holding circcuit from the A.C. power lines to the relay coil K2. A push-button switch PB1 and serially connected switch contacts 113B provide an alternate circuit through which the relay coil K2 can be initially energized. The contacts 113A and 113B are incorporated in the homing switch 113 described previously and visible in FIGURE 5.

As illustrated, the various switches and contacts in the weld-head actuator circuit 125 are in positions corresponding to the situation in which the weld head is at rest at an intermediate position within its vertical travel. To move the weld head downwardly for a weld operation, the operator closes foot pedal switch FP1. Closing switch FP1 energizes the motor windings W3 and W4 with the phase shifting capacitor C3 being in series with the winding W4. The resulting rotation is in a direction which moves the weld head downwardly. The downward movement continues only as long as the foot pedal switch FP1 is closed, and thus can be halted at any point short of the actual initiation of welding.

When the weld head 25 reaches the workpiece and the mechanical weld force has built up sufficiently to overbalance the predetermined tension in the spring 53, the lever 49 is raised and the switch 50 is actuated. Switch contact 50A initiates the discharge of electrical weld energy as explained hereinbefore, while the switch contacts 50B energize the relay coil K2 in the weld-head actuator circuit 125. The energization of relay coil K2 causes the contacts K2A to reverse the connections of the motor windings W3 and W4, that is, the winding W4 will be connected directly to the A.C. source while the winding W3 will be connected to the source through the phase shifting-capacitor C3. This reversal of connections causes the weld-head actuator motor 39 to be rapidly stopped from its rotation in one direction and to begin rotation in the opposite direction. In this way, additional deflection of the lever 49 is prevented, which deflection might cause the application of excessive mechanical force to the weld due to further tensioning of the spring 53. The manner in which the force builds up with respect to time is illustrated in FIGURE 1, described previously.

Simultaneously with the reversing of the motor 39 by the contacts K2A, the contacts K2B set up a holding circuit to the relay coil K2 through normally closed switch contacts 113A. This holding circuit causes the motor 39 to continue its reverse rotation after the weld head 25 has backed away from the workpiece, even though the switch contacts 50B which originally energized the relay coil K2 are thereby reopened. The weld head 25 will be raised without further attention of the operator until the weld head operates the homing switch 113. The switch contacts 113A will be thereby opened, breaking the holding circuit so that the relay coil K2 is deenergized and the relay contacts K2A again reverse the connections to the motor windings W3 and W4. If the foot pedal switch FP1 has been released, the motor 39 will stop with the weld head 25 in its uppermost or home position. If not, the motor 39 will be immediately energized to rotate in its forward direction to again lower the weld head 25. The weld cycle will thus continue to repeat unless the foot pedal switch FP1 is released. This feature is useful for rapid repetition of the welding operation and for so-called stitch welding upon parts which may be caused to move continuously across the head 97, as for example a strip or strips.

The weld head 25 can also be raised to its uppermost position without going through a weld cycle by closing push-button switch PB1. The closing of switch PB1 energizes relay coil K2 through switch contact 113A. The holding circuit through the contacts K2B and 113A will be established in the same manner as when the relay coil K2 was energized by the weld-fire switch 50. Once the relay coil K2 is energized, the motor 39 will raise the weld head 25 until the switch 113 is operated to break the holding circuit by opening contacts 113A. Since switch contacts 113B are in series with the push-button switch PB1, the motor 39 cannot be energized to raise the head 25 beyond the position dictated by the homing switch 113, even though the operator continues to depress the push button.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An automatic electrical resistance welder comprising a member forming a work support and another member comprising an assembly including a weld head carrying an electrode to be driven against the work, an electric-motor-driven mechanism for driving the weld head, the motor of which is mounted to move in response to reaction through said mechanism when the electrode engages a workpiece, a movable reaction arm engaged by the motor to apply an opposing force to the motor, spring means attached to the arm to apply a moment thereto and to provide said opposing force, a movable device for changing the stress in the spring to vary said moment, a second motor, and drive means between said second motor and said movable device for changing said spring stress.

2. An automatic electrical resistance welder comprising a member forming a work support and another member comprising an assembly including a weld head carrying an electrode to be driven against the work, a drive screw having a threaded connection with the weld head, a motor having a shaft carrying said screw, said motor having a non-rotary casing mounted to slide in the direction of the axis of the screw, a movable reaction member engaging the motor casing, resilient biasing means to provide said reaction, a movable device for changing the bias of the resilient biasing means to vary force on said reaction member, a second motor, and drive means between said second motor and said movable device.

3. A welder according to claim 2, wherein said reaction member is a lever, said resilient biasing means is a tension spring connected to the lever and said drive means is a movable scanning member to which the spring is connected, said scanning member forming part of an electrical programming circuit including said second motor.

4. Welding appaartus comprising an assembly including a weld head carrying an electrode to be driven against work to be welded, a first drive for the weld head including a first motor, said motor having a reactively movable casing, a movable reaction member connected with the movable motor casing, a spring anchored at one end to said reaction member and at the other end to a carrier for a scanning contact, a second motor for driving the carrier, stationary contacts to be sequentially engaged by said scanning contact, programming circuitry connected with said stationary contacts for stopping the second motor when the scanning contact reaches a stationary contact which accords to a position of said carrier for stressing said spring predeterminately to load the reaction member.

5. Welding apparatus comprising an assembly including a weld head carrying an electrode to be driven against work to be welded, a first drive screw having a threaded connection with the weld head, a first motor having a shaft carrying said first screw coaxially with the shaft axis, said motor having a casing mounted to slide axially, a movable reaction lever engaging the slidable motor casing, a stretchable tension spring anchored at one end to said reaction lever to load it and at the other end to a slider carrying a scanning contact, a second drive screw threaded with respect to the slider for moving it, a second motor for actuating said second drive screw, stationary contacts to be sequentially engaged by said scanning contact, programmable circuitry connected with said stationary contacts for stopping the second motor when the scanning contact reaches a point at a stationary contact which accords to a position of said slider for tensioning said spring predeterminately to tension said spring for predeterminately loading the lever, and programming means for said circuitry.

6. Welding apparatus according to claim 5, including manually adjustable calibrated means for turning said second drive screw, whereby said programming means may be prepared.

7. Apparatus for controlling the force with which an electrical resistance welder electrode is pressed against a workpiece during welding, said apparatus comprising:
means for driving the electrode into engagement with the workpiece, the engagement producing a reaction force,
means for variably opposing said reaction force,
and means for preloading the opposing means at any one of a plurality of preselected values, the preloading means including:
a scanning contact movable relative to a plurality of scannable contacts, said contacts being positioned so that a different preselected value of preloading is applied to said opposing means when each different scannable contact is contacted by said scanning contact,
means for moving said scanning contact relative to said scannable contacts,
a circuit interconnected with said scanning contact and said scannable contacts, said circuit including means for selecting a discrete one of said scannable contacts and means for deactuating the means for moving the scanning contact when the scanning contact electrically contacts the discrete scannable contact whereby said reaction force is opposed by a particular preselected value of preloading thereby to control the force of said electrode against the workpiece.

8. Apparatus according to claim 7 in which said means for variably opposing the reaction force is a spring which is preloaded to control the force of the electrode against the workpiece.

9. Apparatus according to claim 8, in which the means for driving the electrode is a reversible electric motor, said apparatus further comprising means responsive to an overbalancing of the preloading of said spring by said reaction force for reversing said motor.

10. Apparatus according to claim 7 in which the means for moving said scanning contact is an electric motor and in which the means for deactuating the motor includes means for electrodynamically braking said motor simultaneously with deenergization thereof.

11. Apparatus according to claim 7 in which said scannable contacts are positioned in a row and the means for moving said scanning contact is a reversible electric motor, said apparatus further comprising means for reversing said motor when the scanning contact reaches an end one of said scannable contacts in the row.

12. Apparatus according to claim 7 in which the means for selecting a discrete one of said scannable contacts is a card reader.

13. Electric welding apparatus comprising:
means for driving an electrode into engagement with a workpiece, the engagement producing a reaction force,
spring means for opposing said reaction force,
means for preloading the spring means at any one of a plurality of preselected values, the preloading means including:
a scanning contact movable relative to a plurality of scannable contacts, said contacts being positioned so that a different preselected value of preloading is applied to said opposing means when each different scannable contact is contacted by said scanning contact,
means for moving said scanning contact relative to said scannable contacts,
a circuit interconnected with said scanning contact and said scannable contacts, said circuit including means for selecting a discrete one of said scannable contacts and means for deactuating the means for moving the scanning contact when the scanning contact electrically contacts the discrete scannable contact whereby said reaction force is opposed by a particular preselected value of preloading thereby to control the force of said electrode against the workpiece,
means for providing a current discharge through said electrode, and
means, responsive to an overbalancing of the spring preloading by said reaction force, for initiating the current discharge.

14. Apparatus according to claim 13 in which the current discharge means comprises an energy storage capacitor and means, responsive to a program, for charging said capacitor to a preselected voltage.

15. Welding apparatus according to claim 13 in which the current discharge means includes an energy storage capacitor, a voltage divider having a multiplicity of taps, means for applying a substantially constant voltage across said divider, means for connecting a circuit to a preselected one of said taps, and means controlled by said circuit for charging said capacitor to a voltage which is a function of the voltage at the selected tap.

16. An automatic electrical resistance welder comprising members forming a throat, one of said members forming a work support, the other member comprising an assembly including a weld head carrying an electrode, a motor-driven mechanism for driving the weld head, the motor of which is mounted for movement of a part thereof in response to reaction through said mechanism when the electrode engages a workpiece on said support, a movable reaction member responsive to movement of said motor part, spring means engaged by said reaction member, a movable device for changing the tension of the spring means to vary the force of the spring on said reaction member as it moves, a second motor and drive means between said second motor and said movable device.

References Cited
UNITED STATES PATENTS

| 2,130,657 | 9/1938 | Watkin | 219—86 |
| 3,207,884 | 9/1965 | Davis et al. | 219—89 |

RICHARD M. WOOD, *Primary Examiner.*

P. W. MAY, *Assistant Examiner.*